United States Patent
Berrong et al.

(10) Patent No.: US 6,321,439 B1
(45) Date of Patent: *Nov. 27, 2001

(54) METHOD FOR ASSEMBLY OF A STATOR IN THE FIELD

(75) Inventors: David B. Berrong; John Barry Sargeant; Calvin L. Paris; Gurdev Singh, all of Oviedo, FL (US)

(73) Assignee: Siemens Westinghouse Power Corporation, Orlando, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/243,943

(22) Filed: Feb. 4, 1999

Related U.S. Application Data

(63) Continuation-in-part of application No. 09/028,669, filed on Feb. 24, 1998, now abandoned, which is a continuation-in-part of application No. 08/775,338, filed on Jan. 21, 1997, now Pat. No. 5,875,540.

(51) Int. Cl.⁷ .................................................... H02K 15/02
(52) U.S. Cl. ............................. 29/596; 29/609; 310/217; 310/259; 264/272.2
(58) Field of Search ...................... 29/596, 609; 310/216, 310/217, 259, 43; 264/272.19, 272.2

(56) References Cited

U.S. PATENT DOCUMENTS

| | | | |
|---|---|---|---|
| 2,470,767 | * 5/1949 | Ellis | 318/243 |
| 3,304,358 | * 2/1967 | De Jean et al. | 264/159 |
| 3,631,590 | * 1/1972 | Wichmann et al. | 264/272.2 |
| 3,906,622 | * 9/1975 | Sakano et al. | 264/272.19 |
| 4,352,034 | 9/1982 | Karhan et al. | |
| 4,542,313 | * 9/1985 | Di Pietro | 310/216 |
| 4,614,022 | * 9/1986 | Bibby et al. | 29/596 |
| 4,891,540 | * 1/1990 | Cooper et al. | 310/254 |
| 5,035,043 | * 7/1991 | Newberg | 29/596 |
| 5,365,137 | * 11/1994 | Richardson et al. | 310/258 |

FOREIGN PATENT DOCUMENTS

| | | | |
|---|---|---|---|
| 26 21 377 | 12/1976 | (DE) | . |
| 54-106803 | * 8/1979 | (JP) | 29/596 |

* cited by examiner

Primary Examiner—Lee Young
Assistant Examiner—A. Dexter Tugbang
(74) Attorney, Agent, or Firm—Eckert Seamans Cherin & Mellott, LLC

(57) ABSTRACT

A stator assembly method is disclosed for constructing a generator stator in the field. For stator assembly, the method includes the steps of positioning a stator frame on an assembly site; inserting a plurality of stator core modules into the stator frame; clamping the stator core modules together to form a stator core, attaching the stator core to the stator frame; and, winding a plurality of coil windings into the stator core. The stator may be positioned substantially vertically or horizontally at various steps in the method. The stator assembly method may also employ an assembly base to facilitate construction of the stator in the field.

18 Claims, 4 Drawing Sheets

METHOD FOR ASSEMBLY OF A STATOR IN THE FIELD

CROSS REFERENCE TO RELATED APPLICATIONS

This application is a continuation-in-part of U.S. application Ser. No. 09/028,669, filed Feb. 24, 1998 now abandoned, and U.S. application Ser. No. 08/775,338, filed Jan. 21, 1997 now U.S. Pat. No. 5,875,540.

BACKGROUND OF THE INVENTION

1. Field of the Invention

The present invention generally relates to the design, manufacture and assembly of electrical generation equipment. More particularly, the present invention relates to a method for assembly of a generator stator.

2. Description of the Prior Art

An operational generator comprises a stator including a frame and a core, a rotor, at least one coil winding, and a coupling for coupling the generator to a turning gear or turbine.

The generator stator core is the largest single component in the train of a turbine generator set. Traditionally, stator cores have been manufactured from thousands of laminations of relatively thin steel plates which are stacked, pressed and clamped together into the shape of the stator core (e.g., a large cylindrical form). Clamping is necessary to maintain the geometric form of the stator core and to withstand electromagnetic forces imposed on the stator core during generator operation. Improperly clamped laminations may result in plate vibration during generator operation, which results from magnetic impulses or core elliptical dilation. Moreover, air space between the laminations may lead to high thermal resistance and decreased cooling efficiency. Fillers are often inserted into the stack of plates to compensate for voids caused by plate crown. Additionally, the fillers ensure that the clamping pressure is evenly distributed over the full plate area.

Typically, the stator core is assembled from the steel plates directly at the final manufacturing assembly site. However, the large size of the stator core and the need for proper clamping results in stator core manufacturing difficulties, including generous floor space and high crane requirements. Traditionally, two assembly procedures have been employed to form the cylindrical shaped stator core. In one procedure, the steel plates are stacked directly in a stator frame; in the other procedure, the steel plates are first stacked and clamped in an external stacking fixture. The complete stator core is then lifted into the stator frame via a large crane.

The manufacture of stator cores via the traditional methods results in manufacturing lead time and other associated manufacturing difficulties. For example, if the core is stacked directly in the stator frame, the frame must be delivered to the assembly site before any manufacturing steps can occur. Additionally, intermediate core pressing equipment is needed to press and clamp the steel plates together at incremental lengths. If, on the other hand, the stator core is manufactured in an external fixture, the frame does not have to arrive on site before the manufacturing; however, the external fixture itself adds to the manufacturing costs and requires additional floor space on site. Moreover, the external fixture method requires a heavy duty crane of sufficient height to lift the assembled core into the stator frame. In either traditional manufacturing procedure, the core stacking process requires several days to complete.

In addition to assembly complications, stator cores assembled according to traditional methods may experience operational problems. Such cores have a tendency to settle or relax during service. To help alleviate this tendency, various consolidation techniques and high clamping forces are required during assembly, further increasing the assembly time and costs. Moreover, heavy structural members are required at the core ends to hold the laminations in place, and access for future retightening may be required.

It is also desirable to minimize the costs associated with manufacturing the components necessary to assemble a generator on-site. Production of an excessive volume of generator components can result in increased storage costs and product waste. Thus, there is a need to better control inventory of generator components to reduce manufacturing and storage costs associated with excessive volume production.

Therefore, a need still exists for an improved method for assembling an operational stator in the field or other location.

SUMMARY OF THE INVENTION

The present invention satisfies the needs identified above by providing a method for assembly of a stator in the field.

This assembly method may utilize, at various stages, a stator frame, an assembly base, a plurality of stator core modules, at least one key bar, a plurality of coil windings, and, in one embodiment, a plurality of through bolts.

In the stator assembly method of the present invention, the stator may be assembled in the field by placing the assembly base into the stator frame, inserting the plurality of stator core modules as free standing units into the stator frame, clamping the stator core modules together to form a stator core, and tightening the key bar to attach the stator core to the stator frame. In one embodiment, the stator core modules are clamped together with through bolts.

After the stator core is assembled in the field, the stator is completed by winding the plurality of coil windings into the stator core. Preferably, the step of winding the coil windings includes the use of a rapid field rewind technique.

The assembly methods of the present invention permit a user to assemble a stator in the field, that is, in the vicinity of the site where the generator ultimately will be used. A field assembly method for stators eliminates the need to transport preassembled stators. Consequently, the associated lifting equipment, transportation costs, and time required to load, ship and unload a completed stator are also reduced. In the field, the stator assembly method also eliminates the need for large crane facilities commonly used to set preassembled stators into place.

Other advantages of the method of the present invention stem from the ability of the manufacturer to prebuild generator components in dedicated component factories. This approach is not only more efficient in terms of manufacturing costs, but also permits the manufacturer to build and store generator components in the factory. Consequently, stator components can be inventoried for immediate application. Thus, a manufacturer can fill a customer's order for a generator much more quickly than for a preassembled generator, while at the same time reducing the likelihood of excessive component production. Similarly, the "off-the-shelf" approach provided by the field assembly methods of the present invention reduces the overall cycle time from customer order placement to final installation of the stator and generator in the field.

DETAILED DESCRIPTION OF THE PREFERRED EMBODIMENTS

As used herein, "field" refers generally to any assembly location which is within the vicinity of the end use application site for an assembled generator.

Figure 1:
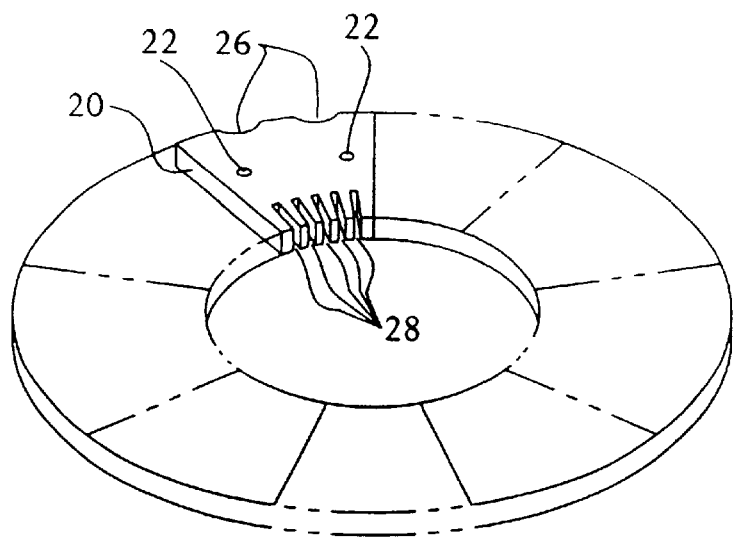
FIG. 1 is an isometric view of a layer of plates forming a single lamination layer used to manufacture a stator core module.

Referring now to the drawings wherein like numerals indicate like elements throughout, FIG. 1 depicts an exemplary stator core plate 20 for use in manufacturing a stator core used in the present invention. Each core plate 20 is stamped from a piece of ferrous material, such as plate steel, and has a plurality of holes 22, notches 26, and grooves 28. Core plates 20, are arranged circumferentially to form rings, e.g., ring 24. Each ring 24 constitutes a single lamination layer in a multi-layered stator core module. In the example depicted in FIG. 1, nine core plates 20 are arranged to form a single ring 24; however, any suitable number of plates can be shaped and configured for use in a stator core of any desired diameter without departing from the scope of the present invention.

Figure 2:
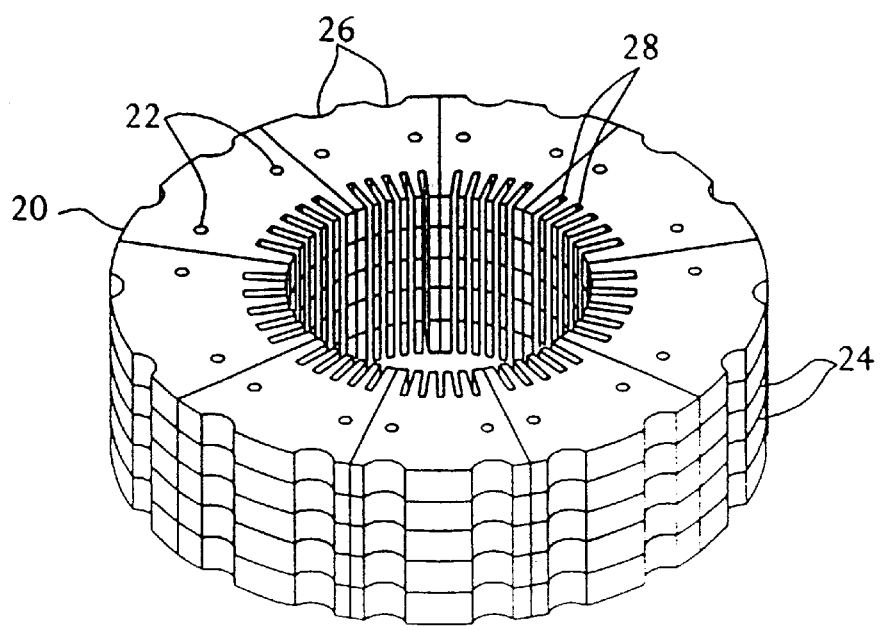
FIG. 2 is an isometric view of a stator core module.

As shown in FIG. 2, a multi-layered laminated stator core module 10 is formed by stacking multiple rings 24. Rings 24 are stacked such that holes 22, notches 26, and grooves 28 of each core plate 20 are respectively aligned with holes 22, notches 26, and grooves 28 of the core plate 20 of the adjacent ring 24. In the example depicted in FIG. 2, five rings 24 are layered to form a single core module 10; however, any suitable number of layers may be used without departing from the scope of the present invention.

The Sargeant application discloses a process for manufacturing a stator core module 10 from a plurality of rings 24. According to this process, each core module 10 is manufactured by clamping a stack of rings 24 in a module fixture. The clamped stack of rings is placed in a vacuum chamber where a resin is applied to the stack. Next, the chamber is pressurized to increase the impregnation of the resin between the plates 20. The clamped stack is removed from the chamber and placed in an oven. The oven is heated until the resin cures, completing the core module 10. Finally, the completed core module 10 is removed from the module fixture. Core modules 10 thus manufactured provide components which may be employed in the generator assembly method of the present invention.

Figure 3:
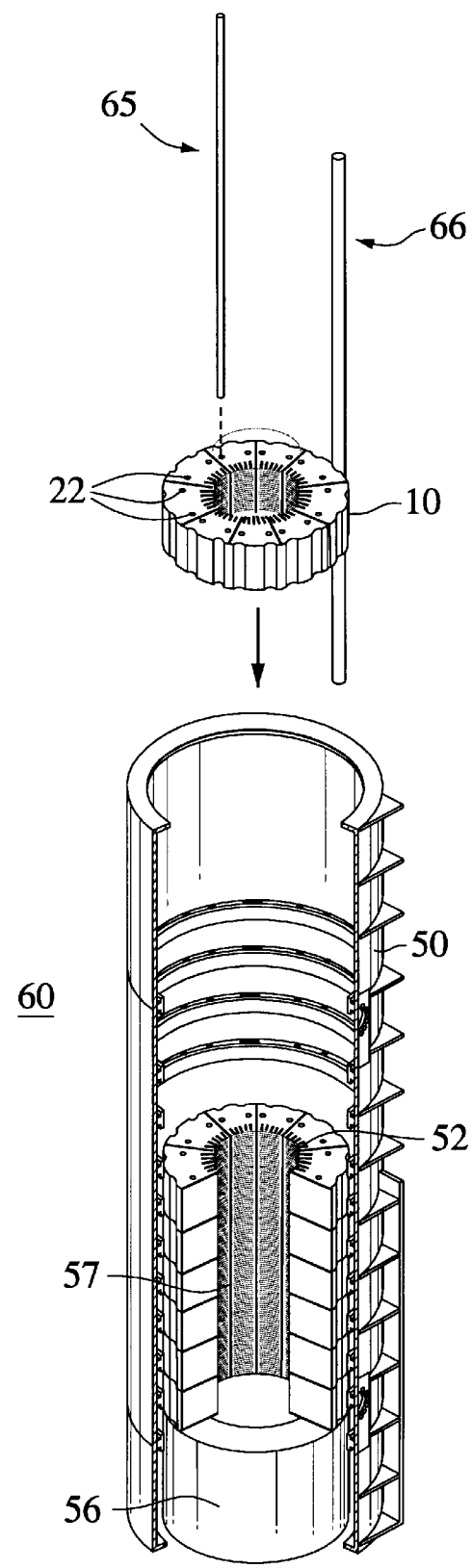
FIG. 3 is an exploded cut-away view of a stator during assembly.
Figure 4:
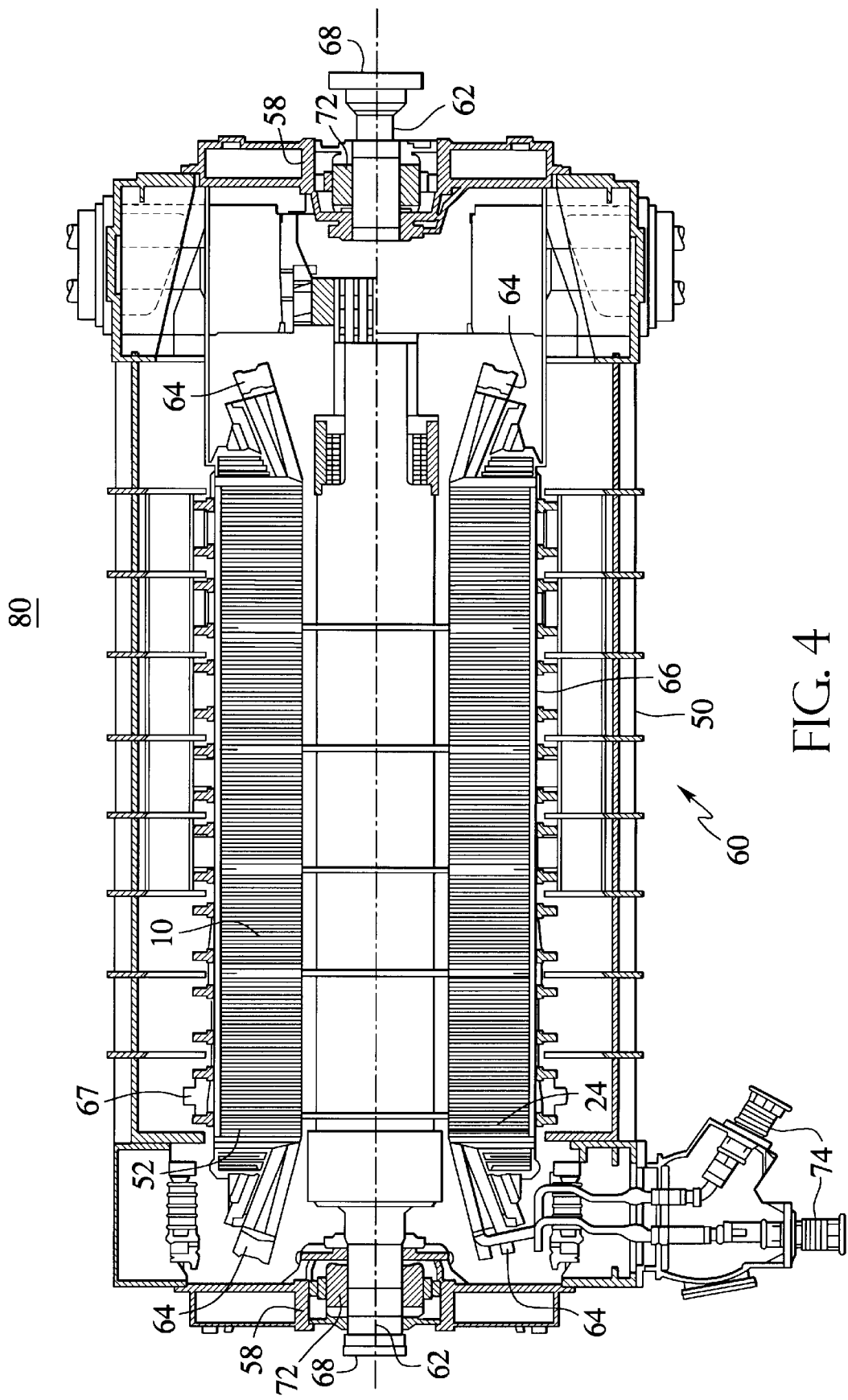
FIG. 4 is a cross-sectional view of a fully assembled generator.

The components employed in the stator assembly method of the present invention are shown in FIGS. 3 and 4 taken together. FIG. 3 is an exploded cut-away view of a stator as it is being assembled in the field. The stator 60 comprises a stator frame 50 and a stator core 52. Unlike a conventional stator, stator 60 is assembled using a plurality of core modules 10. Each core module is a free-standing unit manufactured according to the process described above. By contrast to some traditional methods of manufacturing a stator 60, stator core 52 is assembled directly in frame 50, obviating the use of a separate external fixture at the assembly site and alleviating the need for high pressure stack compression. In stator assembly, additional advantages are obtained by a modular stator core design. For example, core modules 10 are pre-assembled and shipped to the final assembly site at the time of stator assembly. As a result, the modules can be pre-manufactured off-site under better controlled conditions.

Moreover, much lighter duty equipment can be used to lift the core modules 10 into the frame than would otherwise be needed to lift an entire stator core into the frame. The result of these advantages is a stator core with improved operational characteristics, including heat transfer and relaxation. The final assembly time can be shortened from several days to as few as a single day.

Referring again to FIGS. 3 and 4, a fully assembled generator 80 comprises a stator 60, a rotor 62, and a plurality of coil windings 64. Stator 60 has a stator frame 50 having a bearing bracket 58 on at least one end thereof and a stator core 52 made up of a plurality of stator core modules 10 as shown in FIG. 4. Key bar 66 attaches stator core 52 to the spacer rings 67 of stator frame 50 and aligns and supports stator core 52 within stator frame 50. A conventional device such as a spring bar (not shown) may be positioned substantially parallel to key bar 66 to provide attachment of the key bar 66 to the spacer rings 67 of the stator frame 50. The key bar 66 may have a surface, such as a hemispherical surface, which is complementary to notch 26 to enable its subsequent securement to stator core module 10. Key bar 66 orients and maintains the stator core 52 with respect to the rotor 62 and stator frame 50.

Rotor 62 has a coupling 68 on at least one end thereof for coupling rotor 62 to, for example, a turning gear or turbine (not shown). In addition, rotor 62 is rotatably secured within stator 60 by employment of bearing 72 placed between rotor 62 and bearing bracket 58. Leads 74 are electrically connected to coil windings 64. An exciter (not shown) magnetizes rotor 62 and induces a magnetic field in rings 24 which produces the electric current that is extracted from generator 80 through leads 74.

Figure 5:
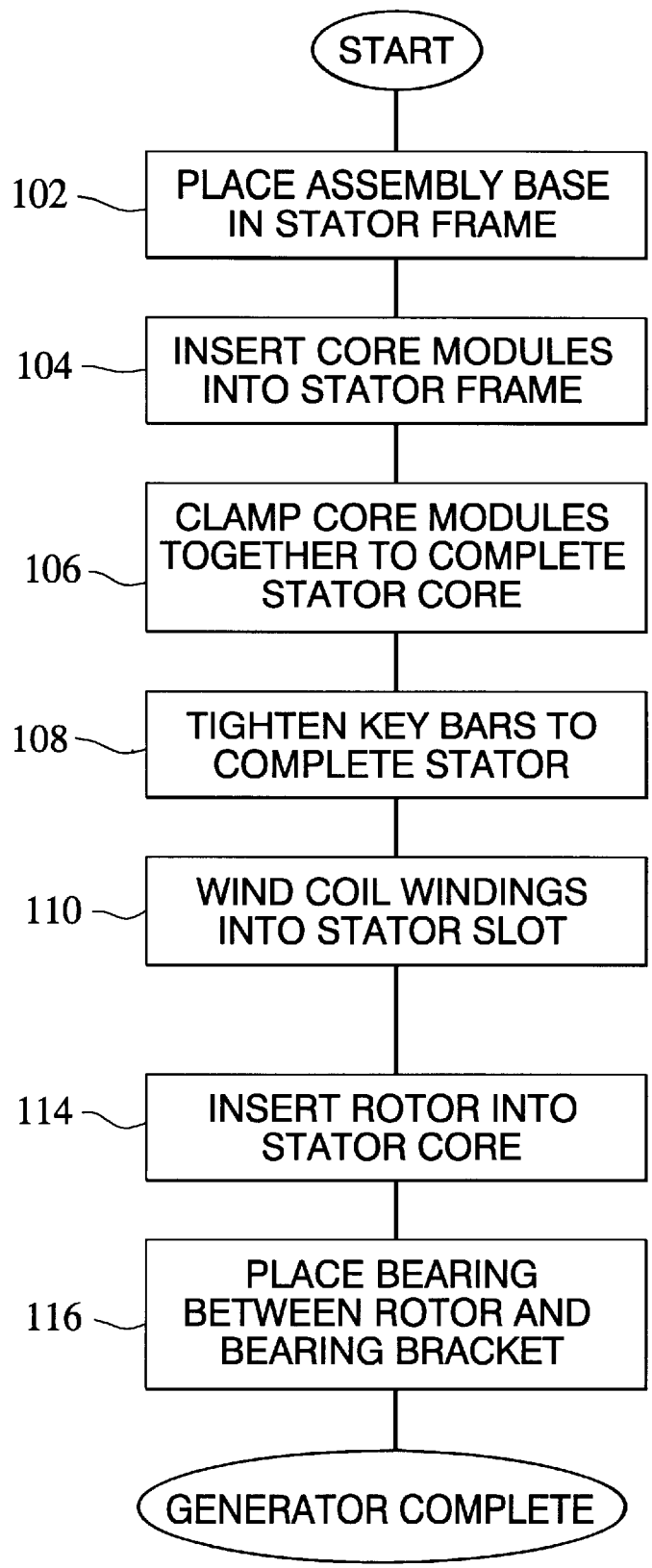
FIG. 5 is a flow chart of the method for assembly of a generator including the stator field assembly method of the present invention.

FIG. 5 is a flow chart which includes the steps of a preferred embodiment of the stator assembly method of the present invention. FIG. 5 also includes steps which may be used in further construction of a complete generator assembly.

Initially, stator frame 50 is placed in a first position to accept core modules 10 as shown in FIG. 3, positioned preferably vertically upright with respect to a generally adjacent assembly surface or site, which may be a concrete foundation. At step 102, assembly base 56 is placed in one end of stator frame 50 (i.e., the bottom if stator frame 50 is assembled in a substantially vertical position). Assembly base 56 is used during assembly to support core modules 10 in the proper position within stator frame 50. After stator frame 50 has been assembled, at step 104, a plurality of core modules 10 are inserted into stator frame 50. The number of core modules 10 employed in the stator assembly will vary depending on the desired stator length and the selected core module size. When all of the core modules 10 are properly positioned in stator frame 50, core modules 10 are clamped together at step 106. To clamp core modules 10 together, through bolts 65 may be inserted axially through stator core 52 via holes 22 and assembly base 56 is removed. The through bolts 65 are provided with conventional fasteners which are tightened to complete stator core 52. Other conventional devices known to those skilled in the art may also be employed to clamp core modules 10 together.

Referring again to FIGS. 3 and 4, once completed, stator core 52 has a stator slot 57 formed from the alignment of grooves 28 in rings 24. At step 108, key bars 66 as shown in FIG. 3 are inserted adjacent to the stacked stator core modules 10. A spring bar (not shown) or other conventional device is then placed substantially parallel between each key bar 66 and the spacer rings 67 of the stator frame 50. The key bars 66 are secured to stator core 52 by a conventional device. The positioning of a spring bar (not shown) between the key bar 66 and the spacer rings 67 may provide attachment of the stator core 52 to the stator frame 50. This arrangement also permits radial vibration of the stator core 52 of the stator 60 during operation of the generator 80. It will be appreciated that a suitable, conventional apparatus may also be utilized to secure the stator core 52 to the stator frame 50.

In another embodiment, stator frame 50 is placed in a second position, preferably horizontally, for the remainder of the generator assembly. At step 110, a plurality of coil windings 64 are wound into stator slot 57, using winding techniques known in the art. In a preferred embodiment, a rapid field rewind technique is used to wind the coil windings 64. Next, at step 114, rotor 62 is inserted into stator core 52 and, at step 116, bearing 72 is placed between rotor 62 and bearing bracket 58. Adjustments are then made to align rotor 62, bearings 72, and bracket 58 to stator core 52 for proper application and sealing. At this point, generator 80 is fully assembled and ready for attachment to, for example, a turning gear or turbine (not shown).

While certain terms of relative orientation, such as "upright" and "bottom", have been used to illustrate certain aspects of the present invention, it will be appreciated that these terms are not intended to limit the scope of the present invention.

Those skilled in the art will recognize that the present invention may be embodied in other specific forms without departing from the spirit or essential attributes thereof. For example, other methods are available to bind the completed stator core together, such as using disk springs and keys inserted into both ends of the frame to lock the modules together. Accordingly, reference should be made to the appended claims, rather than to the foregoing specification, as indicating the scope of the invention.

What is claimed is:

1. A method for assembly of a generator stator in a field comprising:
    positioning a stator frame on an assembly location in said field;
    stacking a plurality of discrete stator core modules into said stator frame, wherein each of said stator core modules is respectively constructed outside said stator frame by a process including the steps of arranging a plurality of annular laminations in tandem and binding the annular laminations together with a resin to form each module as an integral, free-standing unit, separate from components of the frame;
    clamping said plurality of stator core modules together to form a stator core having a stator slot;
    attaching said stator core to said stator frame; and,
    winding a plurality of coil windings into said stator slot.

2. The method of claim 1, wherein said positioning comprises positioning said stator frame substantially vertically and wherein said stator frame is repositioned to a substantially horizontal position after said stator core is attached to said stator frame.

3. The method of claim 1, wherein said stacking includes inserting an assembly base generally adjacent to a first stator frame end and stacking said plurality of stator core modules into a second stator frame end.

4. The method of claim 1, wherein said positioning said stator frame comprises orienting said stator frame substantially horizontally.

5. The method of claim 1, further comprising positioning said stator frame substantially vertically on an assembly base on said assembly location.

6. The method of claim 1, further comprising using a plurality of through bolts for clamping said plurality of stator core modules together.

7. The method of claim 1 wherein the stator core modules are constructed at a manufacturing site remote from said field including the step of shipping the stator core modules from said manufacturing site to said field.

8. The method of claim 1 wherein the stacking step does not insert packing rings or spacers between modules as they are stacked into the stator frame.

9. A method for assembly of a stator in a field comprising:
    positioning a stator frame on an assembly location in said field;
    stacking a plurality of discrete stator core modules into said stator frame, wherein each of said stator core modules is respectively constructed outside said stator frame by a process including the steps of arranging a plurality of annular laminations in tandem and binding the annular laminations together with a resin to form each module as an integral, free-standing unit, separate from components of the frame;
    clamping said plurality of stator core modules together to form a stator core having a stator slot; and,
    attaching said stator core to said stator frame.

10. The method of claim 9, wherein said positioning comprises positioning said stator frame substantially vertically on said assembly location on an end of said stator frame.

11. The method of claim 10, further comprising repositioning said stator frame substantially horizontally after attaching said stator core to said stator frame.

12. The method of claim 9, wherein said positioning comprises positioning said stator frame substantially vertically on an assembly base on said assembly location.

13. The method of claim 9, further comprising repositioning said stator frame substantially horizontally after said stator core is attached to said stator frame.

14. The method of claim 9, further comprising positioning an assembly base on said assembly location and positioning an end of said stator frame on said assembly base.

15. The method of claim 14, further comprising removing said assembly base from said stator frame after said stator core is attached to said stator frame.

16. The method of claim 9, further comprising:
    using a plurality of through bolts for clamping said plurality stator core modules together to form a stator core.

17. The method of claim 9 wherein the stator core modules are constructed at a manufacturing site remote from said field including the step of shipping the stator core modules from said manufacturing site to said field.

18. The method of claim 9 wherein the stacking step does not insert packing rings or spacers between modules as they are stacked into the stator frame.

* * * * *